US012718560B2

(12) United States Patent
Mizukoshi et al.

(10) Patent No.: US 12,718,560 B2
(45) Date of Patent: Aug. 25, 2026

(54) OPERATION SUPPORTING APPARATUS

(71) Applicant: NTT DOCOMO, INC., Tokyo (JP)

(72) Inventors: Yuuichi Mizukoshi, Chiyoda-ku (JP); Nobutaka Matsushima, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 114 days.

(21) Appl. No.: 18/853,899

(22) PCT Filed: Nov. 24, 2022

(86) PCT No.: PCT/JP2022/043373
§ 371 (c)(1),
(2) Date: Oct. 3, 2024

(87) PCT Pub. No.: WO2023/203806
PCT Pub. Date: Oct. 26, 2023

(65) Prior Publication Data
US 2025/0239074 A1 Jul. 24, 2025

(30) Foreign Application Priority Data
Apr. 19, 2022 (JP) ................................ 2022-068893

(51) Int. Cl.
*G06V 20/20* (2022.01)
*G06T 11/00* (2026.01)
(Continued)

(52) U.S. Cl.
CPC .............. *G06V 20/20* (2022.01); *G06T 11/00* (2013.01); *G06V 10/70* (2022.01); *G06V 20/40* (2022.01); *G09B 5/065* (2013.01)

(58) Field of Classification Search
CPC ........ G06V 20/20; G06V 10/70; G06V 20/40; G06T 11/00; G06T 19/00; G09B 5/065;
(Continued)

(56) References Cited

U.S. PATENT DOCUMENTS 11,301,045 B1 * 4/2022 Berme .................... G06F 3/016
11,992,746 B1 * 5/2024 Berme ............... A63B 22/0292
2022/0254072 A1 * 8/2022 Scerra .................. G06K 7/1413

FOREIGN PATENT DOCUMENTS

JP 2017-142790 A 8/2017

OTHER PUBLICATIONS

International Search Report mailed on Feb. 14, 2023 in PCT/JP2022/043373 filed on Nov. 24, 2022, 4 pages (with English translation).

* cited by examiner

*Primary Examiner* — Parul H Gupta
(74) *Attorney, Agent, or Firm* — Oblon, McClelland, Maier & Neustadt, L.L.P.

(57) ABSTRACT

A pair of XR glasses includes an extractor configured to extract an operation video corresponding to a work area from a captured video, a progress information generator configured to generate, based on the operation video, progress information indicative of progress of the operation, a determiner configured to determine, based on the progress information, a process to be supported from among a plurality of processes, a player configured to repeatedly play support information corresponding to the process determined by the determiner until the determined process is completed, and an output controller configured to, in response to video information indicative of a video being included in the support information played by the player, cause a display to display an explanatory video, the display causing the operator to visually recognize a mixed reality space.

9 Claims, 9 Drawing Sheets

(51) Int. Cl.

| | |
|---|---|
| ***G06V 10/70*** | (2022.01) |
| ***G06V 20/40*** | (2022.01) |
| ***G09B 5/06*** | (2006.01) |

(58) Field of Classification Search

CPC . G02B 27/02; G06F 3/01; G09G 5/00; G09G 5/36; G09G 5/38; H04N 7/18; H04N 13/344

See application file for complete search history.

FIG. 3B

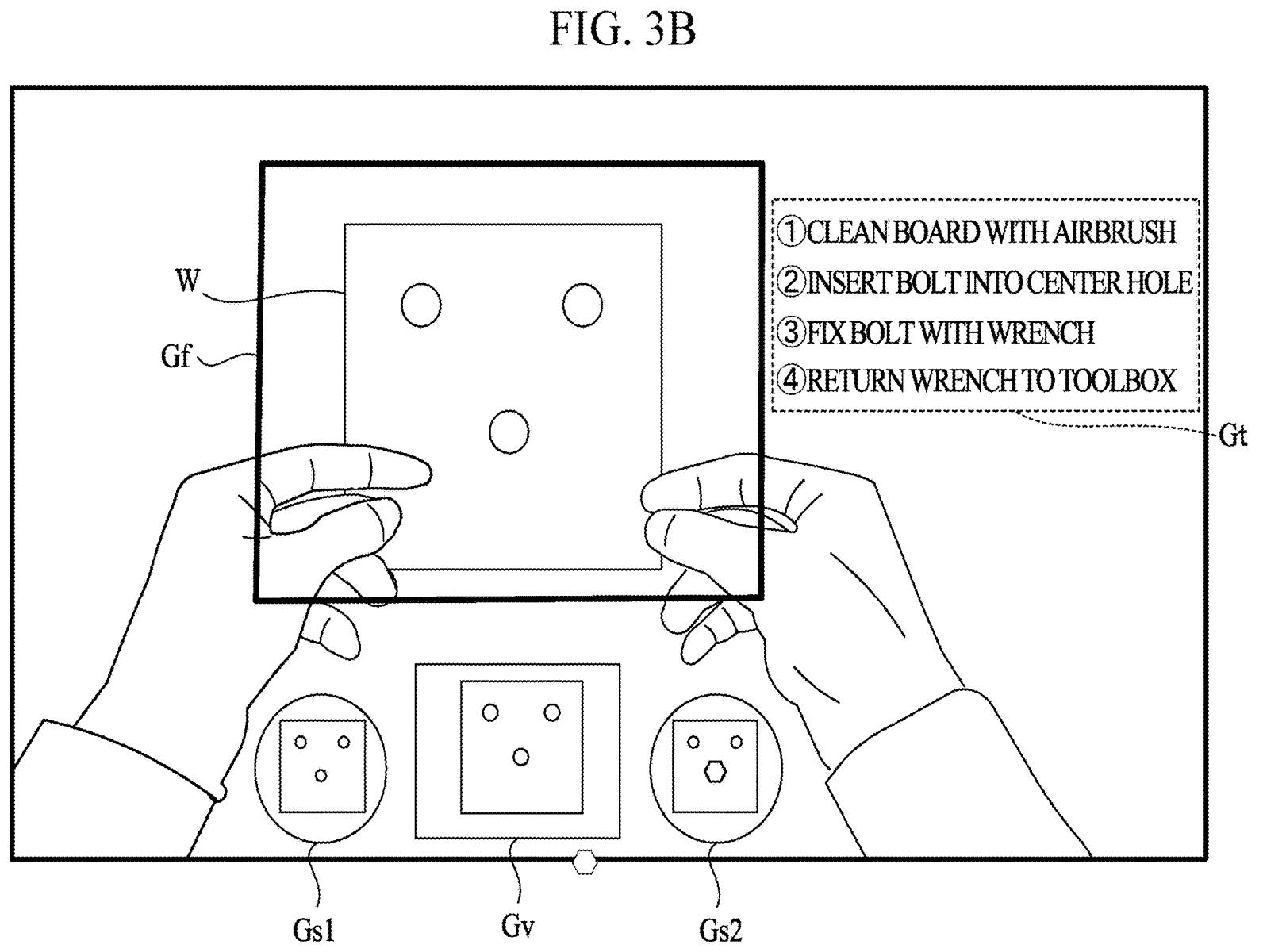

Gt
①CLEAN BOARD WITH AIRBRUSH
②INSERT BOLT INTO CENTER HOLE
③FIX BOLT WITH WRENCH
④RETURN WRENCH TO TOOLBOX
W
Gf
Gs1
Gv
Gs2

| | PROCESS ID | VIDEO INFORMATION | FIRST STILL IMAGE INFORMATION | SECOND STILL IMAGE INFORMATION | TEXT IMAGE INFORMATION |
|---|---|---|---|---|---|
| R1 | 001 | 001.wmv | 011.jpeg | 021.jpeg | 031.jpeg |
| R2 | 002 | 002.wmv | 021.jpeg | 022.jpeg | 032.jpeg |
| R3 | 003 | 003.wmv | 031.jpeg | 032.jpeg | 033.jpeg |

FIG. 6

| | | t0 | t1 | t2 | t3 | | | | | |
|---|---|---|---|---|---|---|---|---|---|---|
| | | Tf | Tf | Tf | Tf | Tf | Tf | Tf | Tf | Tf |
| INPUT TO EXTRACTOR Gx | ... | Gx[6] | Gx[7] | Gx[8] | Gx[9] | Gx[10] | Gx[11] | Gx[12] | Gx[13] | Gx[14] | ... |
| OUTPUT FROM EXTRACTOR Gy | ... | Gy[6] | Gy[7] | Gy[8] | Gy[9] | Gy[10] | Gy[11] | Gy[12] | Gy[13] | Gy[14] | ... |
| OUTPUT FROM FIRST TRAINED MODEL | ... | F[5] | F[6] | F[7] | F[8] | F[9] | F[10] | F[11] | F[12] | F[13] | ... |
| INPUT TO SECOND TRAINED MODEL | ... | F[5] | F[6] | F[7] | F[8] | F[9] | F[10] | F[11] | F[12] | F[13] | ... |
| | ... | F[4] | F[5] | F[6] | F[7] | F[8] | F[9] | F[10] | F[11] | F[12] | ... |
| | ... | F[3] | F[4] | F[5] | F[6] | F[7] | F[8] | F[9] | F[10] | F[11] | ... |
| | ... | F[2] | F[3] | F[4] | F[5] | F[6] | F[7] | F[8] | F[9] | F[10] | ... |
| | ... | F[1] | F[2] | F[3] | F[4] | F[5] | F[6] | F[7] | F[8] | F[9] | ... |
| OUTPUT FROM SECOND TRAINED MODEL | ... | P[4] | P[5] | P[6] | P[7] | P[8] | P[9] | P[10] | P[11] | P[12] | ... |

OPERATION SUPPORTING APPARATUS

TECHNICAL FIELD

The present invention relates to operation supporting apparatuses.

BACKGROUND ART

Patent Document 1 discloses an operation supporting system for using a head-mounted display to support an operation. This operation supporting system executes image recognition on an outside view image captured by a camera to determine a current procedure from among a plurality of procedures to be performed by an operator. The operation supporting system further uses an instruction, which is in association with the current procedure, to generate procedure information. The head-mounted display displays an instruction indicated by the procedure information so as not to excessively obstruct a field of view of the operator. This procedure is the smallest unit of the operation. The instruction may be a message such as "Attach a circular saw No. XXX," for example.

RELATED ART DOCUMENT

Patent Document

Patent Document 1:
Japanese Patent Application Laid-Open Publication No. 2017-142790.

SUMMARY OF THE INVENTION

Problem to be Solved by the Invention

An operation is typically constituted of a plurality of processes. For example, a jig is attached to a target for an operation in a first process, the target for the operation is processed by a machine tool in a second process, the jig is removed in a third process, and the processed target is inspected in a fourth process. Each of the processes includes a plurality of procedures. In an actual operation, an operator who is unfamiliar with the operation sometimes wants to know not only the current procedure, but also the flow of work from a previous procedure to a future procedure in a process.

However, the conventional operation supporting system only displays an instruction in association with a procedure that is the smallest unit of an operation, and it is not possible to know the flow of work in a process.

An object of this disclosure is to provide an operator with the flow of work in a current process.

Means for Solving Problem

An operation supporting apparatus according to this disclosure is an operation supporting apparatus wearable on a head of an operator performing an operation including a plurality of processes in a work area, the operation supporting apparatus including an extractor configured to extract an operation video corresponding to the work area from a captured video provided by a capturing device capturing an outside world in a state in which the operator performs the operation, a progress information generator configured to generate, based on the operation video, progress information indicative of progress of the operation, a determiner configured to determine, based on the progress information, a process to be supported from among the plurality of processes, a player configured to repeatedly play a piece of support information corresponding to the process determined by the determiner among a plurality of pieces of support information that are in one-to-one correspondence with the plurality of processes until the determined process is completed, and an output controller configured to: in response to video information indicative of a video being included in the piece of support information played by the player, cause a display to display an explanatory video indicated by the video information, the display causing the operator to visually recognize a mixed reality space, and in response to audio information indicative of sounds being included in the piece of support information played by the player, cause a loudspeaker to output the sounds indicated by the audio information.

Effect of Invention

According to this disclosure, in an operation constituted of a series of multiple processes, it is possible to provide an operator with the flow of work from a previous procedure to a future procedure in a current process.

BRIEF DESCRIPTION OF THE DRAWINGS

FIG. 3B is an explanatory diagram showing an example of a mixed reality space visually recognized by the operator through the pair of XR glasses 1.

FIG. 6 is a timing chart showing an operation of an extractor 111 and an operation of a progress information generator 112.

MODES FOR CARRYING OUT THE INVENTION

1: Embodiment

With reference to FIG. 1 to FIG. 8, a pair of XR glasses 1 for supporting an operator will be described.

1.1: Outline of Embodiment

Figure 1:
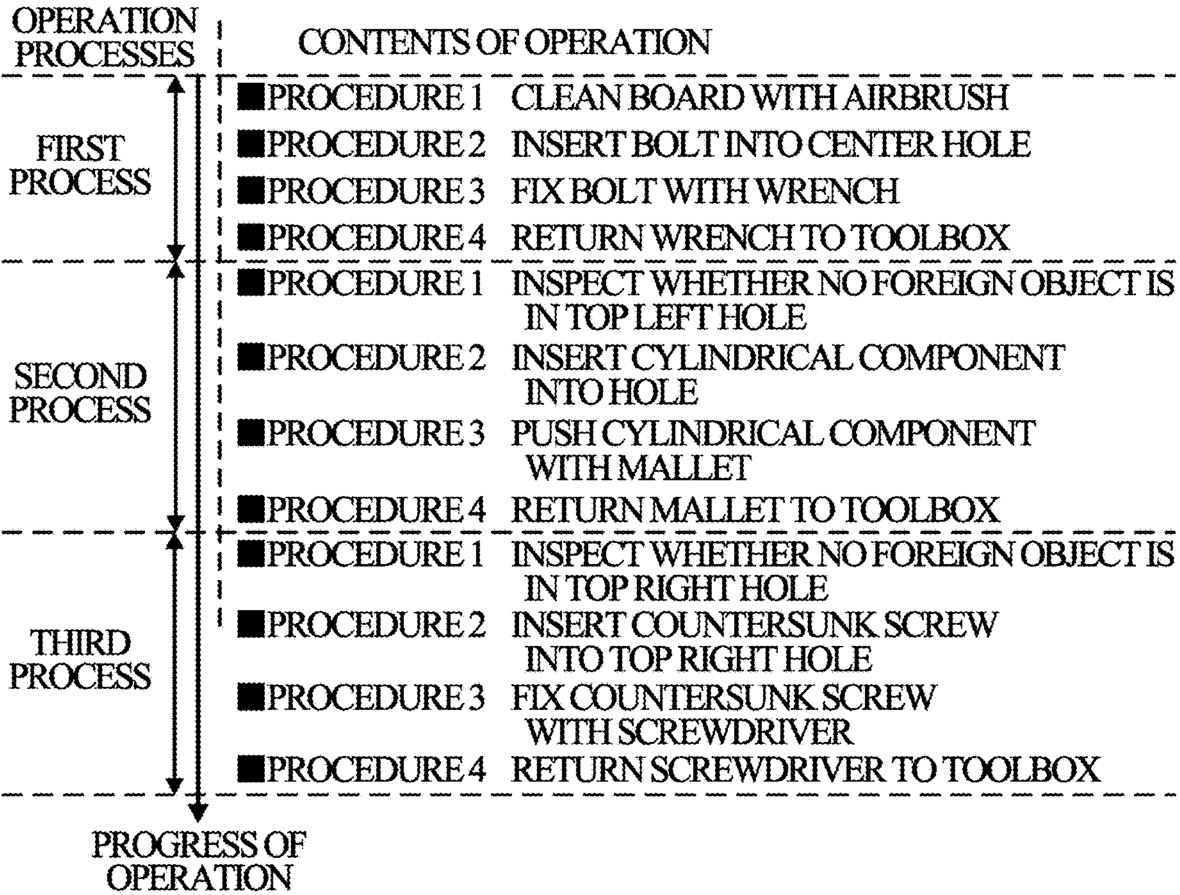
FIG. 1 is an explanatory diagram showing an example of an operation to be performed by an operator.

This embodiment relates to an operation supporting apparatus for supporting an operator when the operator preforms an operation including a plurality of processes. FIG. 1 is an explanatory diagram showing an example of the operation to be performed by the operator. In this embodiment, it is assumed that the operation is performed that is constituted of a first process, a second process, and a third process.

However, the number of processes included in the operation is not limited to three so long as it is greater than or equal to two. A process includes one or more procedures.

In the example shown in FIG. 1, each of the plurality of processes includes four procedures. The operation supporting apparatus generates progress information based on a captured video obtained by capturing a work area. The progress information indicates progress of the operation. The progress of the operation means the position of a current work in the overall operation. Each of the plurality of processes is completed in response to the last procedure being completed. The first process is completed in a state in which a wrench is returned to a toolbox in response to a corresponding procedure 4 being completed. The second process is completed in a state in which a mallet is returned to the toolbox in response to a corresponding procedure 4 being completed. The third process is completed in a state in which a screwdriver is returned to the toolbox in response to a corresponding procedure 4 being completed. By referring to the progress information, it is possible to determine a process to which the current work belongs from among the plurality of processes and to determine whether a current process is completed. The operation supporting apparatus provides support to the operator based on the progress information.

2.2: Configuration of Pair of XR Glasses

Figure 2:
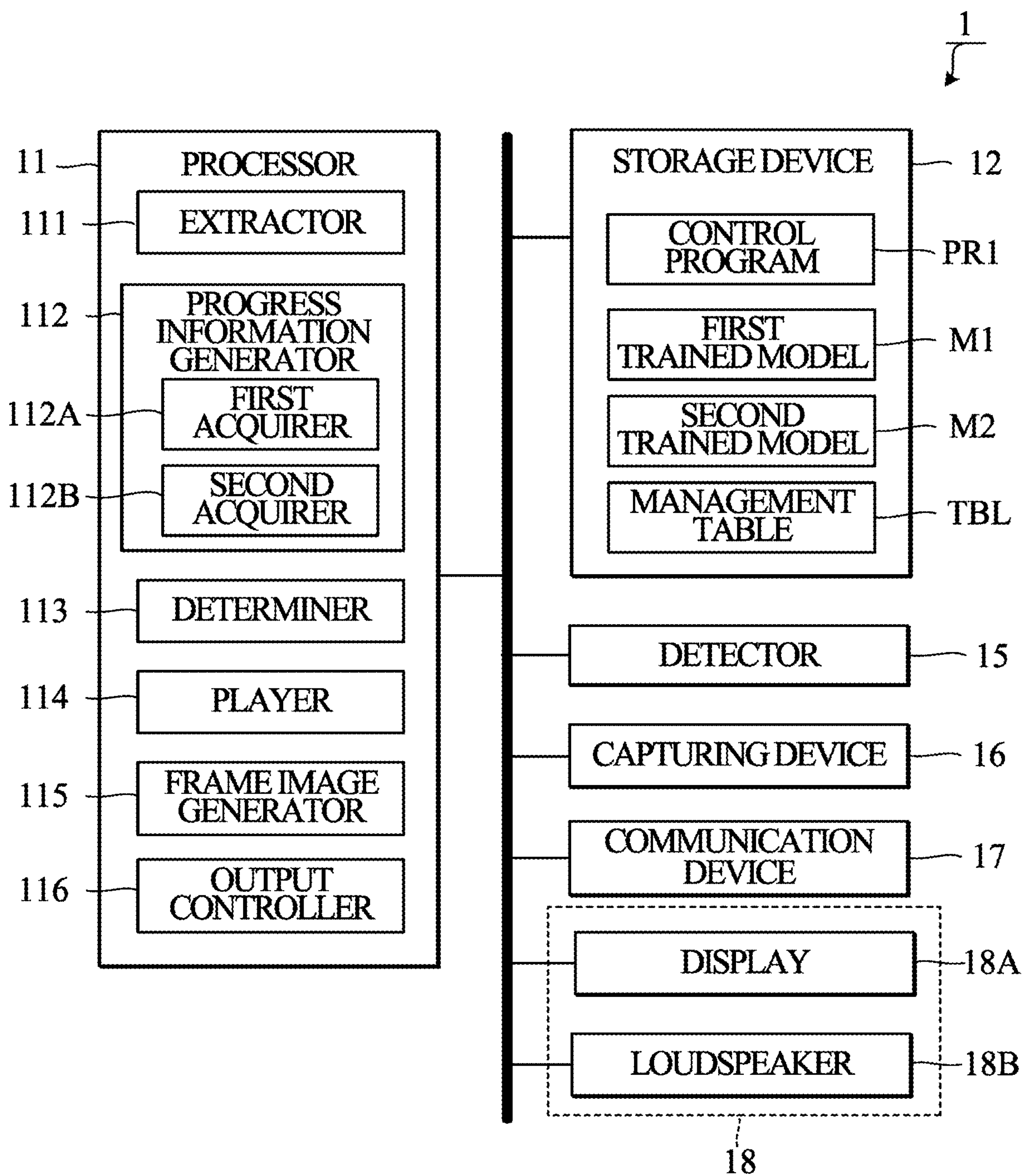
FIG. 2 is a block diagram showing an example of a configuration of a pair of XR glasses 1.

FIG. 2 is a block diagram showing an example of a configuration of the pair of XR glasses 1. The pair of XR glasses 1 is worn on the head of the operator. The pair of XR glasses 1 is an example of the operation supporting apparatus for supporting the operator when the operation including the plurality of processes is performed in the work area.

The pair of XR glasses 1 is a see-through type of glasses through which virtual objects are visible. The operator visually recognizes a real space through the pair of XR glasses 1 and visually recognizes the virtual objects through the pair of XR glasses 1. The virtual objects are in association with a location in the real space and are placed in a virtual space. The operator uses the pair of XR glasses 1 to visually recognize a mixed reality space in which the real space and the virtual space are combined together.

Figure 3A:
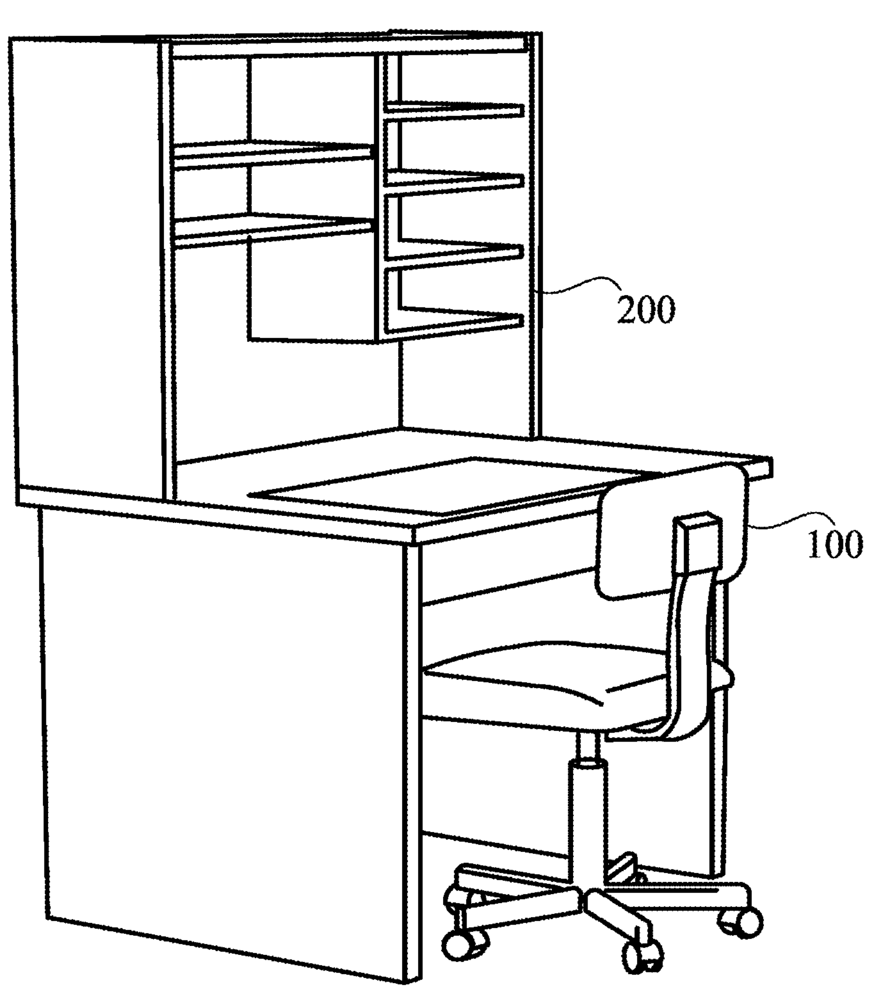
FIG. 3A is a perspective view of an example of an operation environment.

For example, when the operator sits on a chair 100 shown in FIG. 3A and performs the operation on a workbench 200, the operator visually recognizes the mixed reality space shown in FIG. 3B through the pair of XR glasses 1. In this example, the operator will perform the operation to fix three components to a board W, which is an operation target, in the work area on the workbench 200.

In the mixed reality space shown in FIG. 3B, there are real objects and virtual objects. The real objects correspond to an upper surface of the workbench 200, the left and right hands of the operator, and the board W. The virtual objects correspond to a frame image Gf, a first still image Gs1, a second still image Gs2, an explanatory video Gv, and a text image Gt. The frame image Gf represents an outer edge of the work area. The first still image Gs1 represents a state of the board W at the beginning of a current process. The explanatory video Gv represents, for example, an operation example model for the current process. The text image Gt represents a plurality of procedures included in the current process. The explanatory video Gv is played at a constant rate. Thus, the explanatory video Gv may be completed while the operator performs the current process. While the operator performs the current process, the explanatory video Gv is repeatedly played. Thus, when it takes time to perform the operation, the operator can repeatedly check contents of the current process.

When the current process is completed, the first still image Gs1, the second still image Gs2, the explanatory video Gv, and the text image Gt are switched to contents of a subsequent process. Thus, the operator can receive new operation support without preforming an operation to switch the contents of support each time a process advances to a subsequent process. As a result, the operator need not interrupt an operation in which both hands are used.

The pair of XR glasses 1 includes a processor 11, a storage device 12, a detector 15, a capturing device 16, a communication device 17, and an output device 18. Each element of the pair of XR glasses 1 is interconnected by a single bus or by multiple buses for communicating information. The term "apparatus" in this specification may be understood as equivalent to another term such as circuit, device, unit, etc.

The processor 11 is a processor configured to control the entire pair of XR glasses 1. The processor 11 is constituted of a single chip or of multiple chips, for example. The processor 31 is constituted of a central processing unit (CPU) that includes, for example, interfaces for peripheral devices, arithmetic units, registers, etc. One, some, or all of the functions of the processor 11 may be implemented by hardware such as a digital signal processor (DSP), an application specific integrated circuit (ASIC), a programmable logic device (PLD), or a field programmable gate array (FPGA). The processor 11 executes various processing in parallel or sequentially.

The storage device 12 is a recording medium readable and writable by the processor 11. The storage device 12 stores a plurality of programs including a control program PR1 to be executed by the processor 11, a first trained model M1, a second trained model M2, and a management table TBL. The management table TBL stores a plurality of pieces of support information in one-to-one correspondence with the plurality of processes. The storage device 12 functions as a work area of the processor 11.

Figure 4:
FIG. 4 is an explanatory diagram showing contents stored in a management table TBL.
Figure 5A:
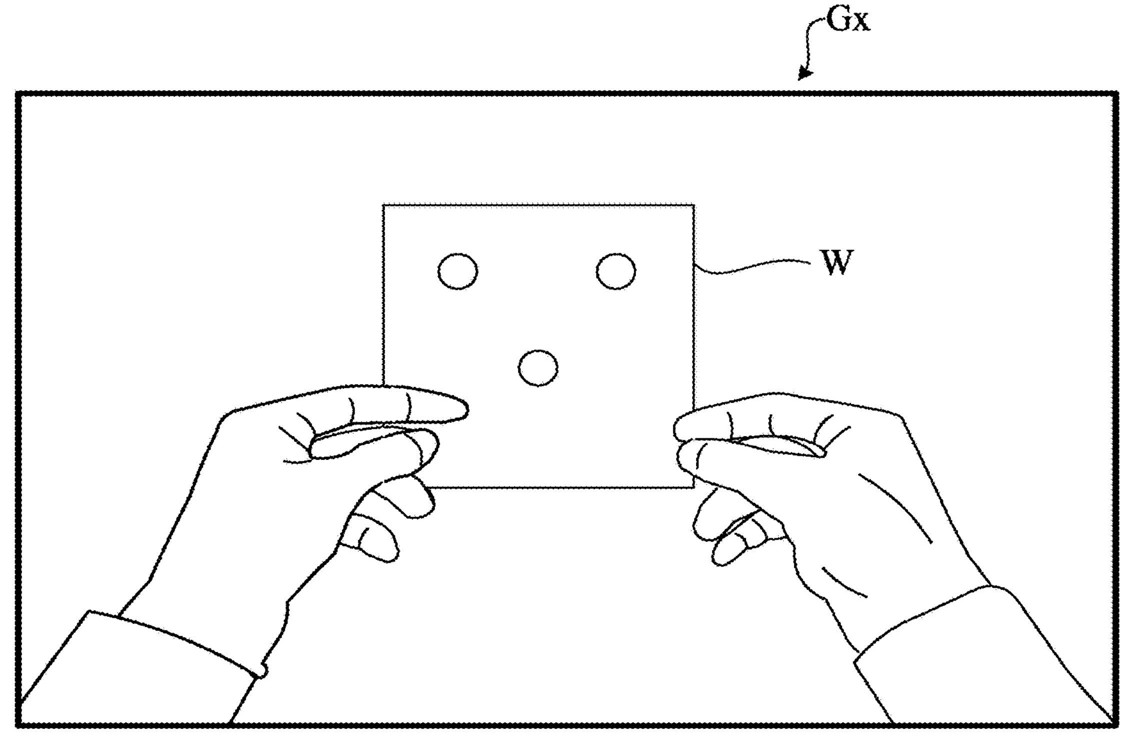
FIG. 5A is an explanatory diagram showing an example of a captured video Gx.
Figure 5B:
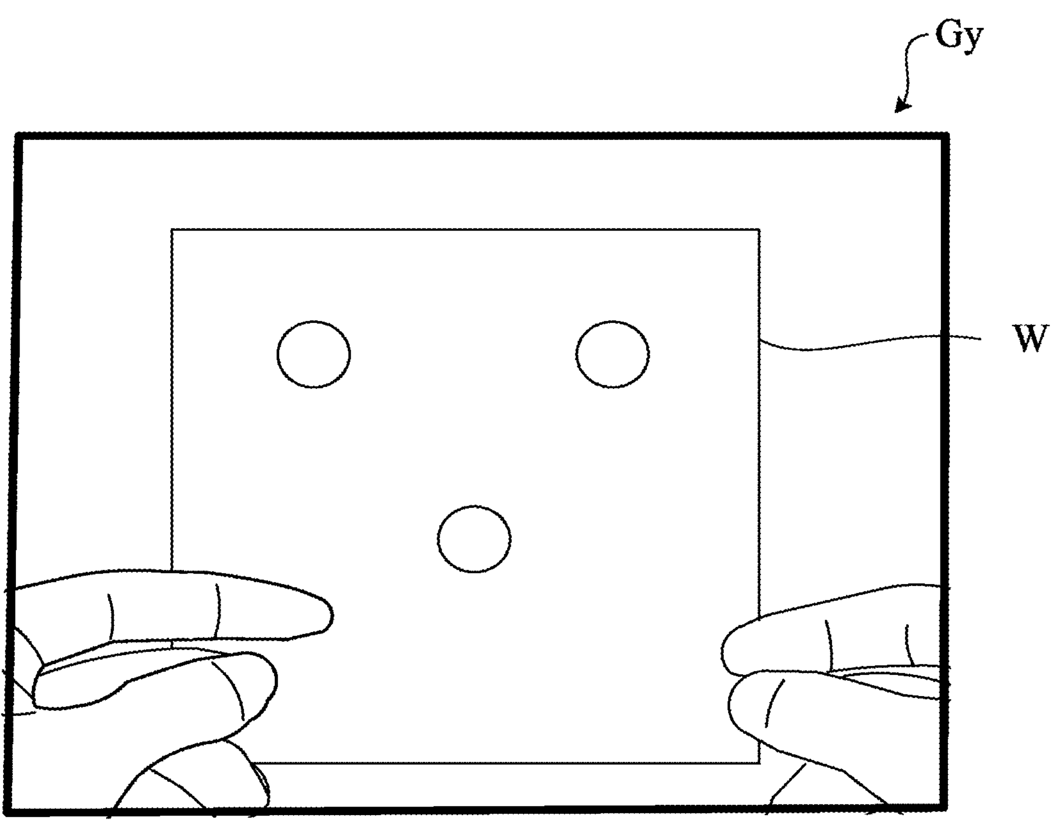
FIG. 5B is an explanatory diagram showing an example of an operation video Gy.

FIG. 4 is an explanatory diagram showing contents stored in the management table TBL. The management table TBL has a record R1 corresponding to the first process, a record R2 corresponding to the second process, and a record R3 corresponding to the third process. In a record R, a process ID that identifies a process is in association with support information for supporting the operation by the operator. The support information includes video information, first still image information, second still image information, and text image information. The video information is information indicative of the explanatory video Gv. The explanatory video Gv may have freely selected contents as long as it has contents for supporting the operator in the process. The contents of the explanatory video Gv may be, for example, an operation example model, or may be contents for pointing out points to be noted.

For example, video information for the first process is "001.wmv." The first still image information is information indicative of the first still image Gs1. For example, first still image information for the first process is "011.jpeg." The second still image information is information indicative of the second still image Gs2. For example, second still image information for the first process is "021.jpeg." The text image information is information indicative of the text image Gt. For example, text image information for the first process is "031.jpeg."

The detector 15 detects a state of the pair of XR glasses 1. The detector 15 includes, for example, an inertial sensor, such as an acceleration sensor for sensing acceleration and a gyroscopic sensor for sensing angular acceleration, and a geomagnetic sensor for sensing direction. The acceleration sensor senses acceleration in a direction along an axis that is any one of an X-axis, a Y-axis, and a Z-axis that are perpendicular to one another. The gyroscopic sensor senses angular acceleration of rotation having a rotation axis that is any one of the X-axis, the Y-axis, and the Z-axis. The detector 15 can generate orientation information indicative of an orientation of the pair of XR glasses 1 based on output information from the gyroscopic sensor. Movement information includes acceleration information indicative of acceleration for each of the three axes and angular acceleration information indicative of angular acceleration for each of the three axes. The detector 15 provides the processor 11 with the orientation information indicative of the orientation of the pair of XR glasses 1, the movement information on movement of the pair of XR glasses 1, and direction information indicative of a direction of the pair of XR glasses 1.

The capturing device 16 provides the captured video Gx obtained by capturing the outside world. The capturing device 16 includes lenses, a capturing element, an amplifier, and an AD converter, for example. Light beams focused through the lenses are converted by the capturing element into a captured image signal, which is an analog signal. The amplifier amplifies the captured image signal and provides the amplified captured image signal to the AD converter. The AD converter converts the amplified captured image signal, which is an analog signal, into the captured image information, which is a digital signal. The captured image information, which has been made through the conversion, is provided to the processor 11. The capturing device 16 is, for example, a camera.

A shape of the pair of XR glasses 1 is substantially the same as that of a typical pair of glasses. The pair of XR glasses 1 includes a left lens, a right lens, and a frame for supporting the left lens and the right lens. The frame includes a bridge, which is provided between the left lens and the right lens, and a pair of temples to be disposed on the left and right ears of a person. The capturing device 16 is provided in the bridge. Thus, the capturing device 16 captures the outside world in a direction in which the face of the operator is facing.

The communication device 17 is hardware that is a transmitting and receiving device configured to communicate with other devices. For example, the communication device 17 may be referred to as a network device, a network controller, a network card, a communication module, etc. The communication device 17 may include a connector for wired connection. The communication device 17 may include a wireless communication interface. The connector for wired connection and an interface circuit for wired connection may conform to wired LAN, IEEE1394, or USB. The wireless communication interface may conform to wireless LAN or Bluetooth (registered trademark), etc.

The output device 18 includes a display 18A and a loudspeaker 18B. The display 18A is a device for displaying images. The display 18A displays various types of images under the control of the processor 11. A left temple of the pair of temples of the pair of XR glasses 1 is provided with a display panel for the left eye of the operator, and with an optical member for guiding light beams, which are emitted by the display panel for the left eye, to the lens. Light beams from the outside world pass through a one-way mirror provided in the left lens to be directed to the left eye of the operator, and the light beams guided by the optical member are reflected by the one-way mirror to be directed to the left eye of the operator. A right temple of the pair of temples and the right lens are constituted in a similar manner. The display 18A includes the left lens, the right lens, the display panel for the left eye, the display panel for the right eye, the optical member for the left eye, and the optical member for the right eye. According to the above-described configuration, the operator can watch images displayed by the display panel in a transparent state in which the images are superimposed on images of the outside world. The pair of XR glasses 1 causes the display panel for the left eye to display a left-eye image of stereo-pair images and causes the display panel for the right eye to display a right-eye image of the stereo-pair images. Thus, the pair of XR glasses 1 causes the operator to feel as if the displayed images have depth and a stereoscopic effect.

The loudspeaker 18B converts an audio signal provided by the processor 11 into sounds and emits the sounds. The audio signal is an example of audio information.

In the above-described configuration, the processor 11 reads the control program PR1 from the storage device 12 and executes the read control program PR1 to function as an extractor 111, a progress information generator 112, a determiner 113, a player 114, a frame image generator 115, and an output controller 116. In addition, the processor 11 executes the first trained model M1 and the second trained model M2.

The extractor 111 extracts an operation video Gy corresponding to the work area from the captured video Gx provided by the capturing device 16 in a state in which the operator performs the operation. For example, when the operator visually recognizes the mixed reality space shown in FIG. 3B through the pair of XR glasses 1, the captured video Gx comprises an image shown in FIG. 5A, and the operation video Gy comprises an image shown in FIG. 5B.

The progress information generator 112 generates, based on the operation video Gy, progress information P indicative of progress of the operation. The progress of the operation means the position of a current work in the overall operation. Specifically, the progress information generator 112 uses the first trained model M1 and the second trained model M2 so as to generate the progress information. The first trained model M1 is trained to learn a relationship between an image of a frame and a feature. The second trained model M2 is trained to learn a relationship between features of frames and state information indicative of progress of the operation. The first trained model M1 and the second trained model M2 may be constituted of, for example, a deep neural network (DNN). More particularly, the first trained model M1 and the second trained model M2 may use a convolutional neural network for image classification, which is called a visual geometry group network (VGGNet).

The progress information generator 112 includes a first acquirer 112A and a second acquirer 112B. The first acquirer 112A acquires features F of frames of the operation video Gy individually by inputting, to the first trained model M1, still images of the frames of the operation video Gy individually.

The second acquirer 112B acquire the progress information P provided by the second trained model M2 by inputting, to the second trained model M2, features F of frames from a current frame of the operation video Gy to a frame before the current frame of the operation video Gy by a predetermined number of frames.

A duration from a third point in time at which a frame starts until a fourth point in time at which the frame terminates is referred to as a frame duration Tf, a delayed duration from a first point in time at which a still image is input to the first trained model M1 until a second point in time at which the feature is provided by the first trained model M1 is referred to as a first duration Td1, and a delayed duration from a fifth point in time at which the features of the predetermined number of frames are input to the second trained model M2 until a sixth point in time at which the progress information P is provided by the second trained model M2 is referred to as a second duration Td2. In this case, the frame duration Tf, the first duration Td1, and the second duration Td2 have the following relationships:

$$Td1 \leq Tf \text{ and} \quad \text{(Equation 1)}$$

$$Td2 \leq Tf. \quad \text{(Equation 2)}$$

FIG. 6 is a timing chart showing an operation of the extractor 111 and an operation of the progress information generator 112. Gx[n] shown in FIG. 6 indicates an n-th frame of the captured video Gx. Gy[n] indicates an n-th frame of the operation video Gy. F[n] indicates a feature of the n-th frame. P[n] indicates progress information P for the n-th frame. It is to be noted that n is an integer. In this example, the frame duration Tf, the first duration Td1, and the second duration Td2 are equal, and features F of frames from the current frame to a frame that is five frames before the current frame are input into the second trained model M2.

As shown in FIG. 6, the extractor 111 extracts the operation video Gy from the captured video Gx without delay. The first acquirer 112A takes the frame duration Tf to acquire the feature F using the first trained model M1. For example, the first acquirer 112A inputs a still image Gy[8] corresponding to an eighth frame of the operation video Gy to the first trained model M1 within a time period from a time to t0 a time t1. This input causes the first acquirer 112A to acquire a feature F[8] corresponding to the eighth frame from the first trained model M1 within a time period from the time t1 to a time t2.

The second acquirer 112B takes the frame duration Tf to acquire a current process (progress information P) using the second trained model M2. For example, the second acquirer 112B inputs features F[4] to F[8] corresponding to fourth to eighth frames of the operation video Gy to the second trained model M2 within the time period from the time t1 to the time t2. This input causes the second acquirer 112B to acquire progress information P[8] from the second trained model M2 within a time period from the time t2 to a time t3. Thus, a delay time from a point in time at which the still image Gy[8] of the eighth frame of the operation video Gy is obtained, until a point in time at which the progress information P[8] corresponding to the frame is generated, is less than or equal to twice the frame duration Tf.

The second acquirer 112B stores features F corresponding to previous frames in the storage device 12. Then, the second acquirer 112B uses the stored features F corresponding to the previous frames to input, to the second trained model M2, features F of frames from the current frame to the frame before the current frame by the predetermined number of frames. Thus, it is not necessary to calculate the features F of the previous frames using the first trained model M1 again. As a result, it is possible to reduce a processing time required by the progress information generator 112.

The determiner 113 determines, based on the progress information P, a process to be supported from among the plurality of processes. For example, when the progress information P indicates completion of the procedure 1 to the procedure 3 in the second process shown in FIG. 1, the determiner 113 determines to support the second process. When the progress information P indicates completion of the procedure 4 in the second process shown in FIG. 1, the determiner 113 determines to support the third process. In other words, when the current work belongs to a process and completion of the process is not detected, the determiner 113 determines to support the process. On the other hand, when the current work belongs to a process and completion of the process is detected, the determiner 113 determines to support a subsequent process following the process.

The player 114 repeatedly plays a piece of support information corresponding to the process determined by the determiner 113 among the plurality of pieces of support information in one-to-one correspondence with the plurality of processes until the determined process is completed. For example, when the determiner 113 determines to support the second process, the player 114 reads the video information "002.wmv," the first still image information "021.jpeg," the second still image information "022.jpeg," and the text image information "032.jpeg" in association with the record R2 among the plurality of records R1, R2 and R3 stored in the management table TBL, and plays the read information. The player 114 converts each piece of information into an image. For example, the player 114 decodes the video information to generate the explanatory video Gv. A play time of the explanatory video Gv is fixed. In contrast, an operation time required by the operator for the current process varies. Thus, when playing of the explanatory video Gv is completed, the operator may not have completed work related to the current process. The player 114 repeatedly plays the video information during a period from a point in time at which the operator starts the current process to a point in time at which the operator completes the current process.

The frame image generator 115 generates, based on the captured video Gx, the frame image Gf representing the outer edge of the work area. For example, when a color of the work area is a specific color that can be distinguished from the surrounding area, the frame image generator 115 may generate the frame image Gf by executing image processing to recognize the specific color on the captured video Gx.

When video information is included in the piece of support information played by the player 114, the output controller 116 causes the display 18A to display the explanatory video Gv indicated by the video information. Furthermore, the output controller 116 causes the display 18A to display the first still image Gs1 indicated by the first still image information, the second still image Gs2 indicated by the second still image information, the text image Gt indicated by the text image information, and the frame image Gf. In addition, the output controller 116 causes the display 18A to display the explanatory video Gv, the first still image Gs1, the second still image Gs2, and the text image Gt so as not to overlap the work area. Thus, since the images related to the support information are displayed so as not to overlap the work area, the operator can accurately recognize a state of the operation. Since the frame image Gf represents the outer edge of the work area, the operator is prompted to perform the operation inside the frame image Gf. As a result, the target for the operation is captured in the operation video Gy. Thus, it is possible to improve accuracy of determining the current process.

3: Operation of Embodiment

Figure 7:
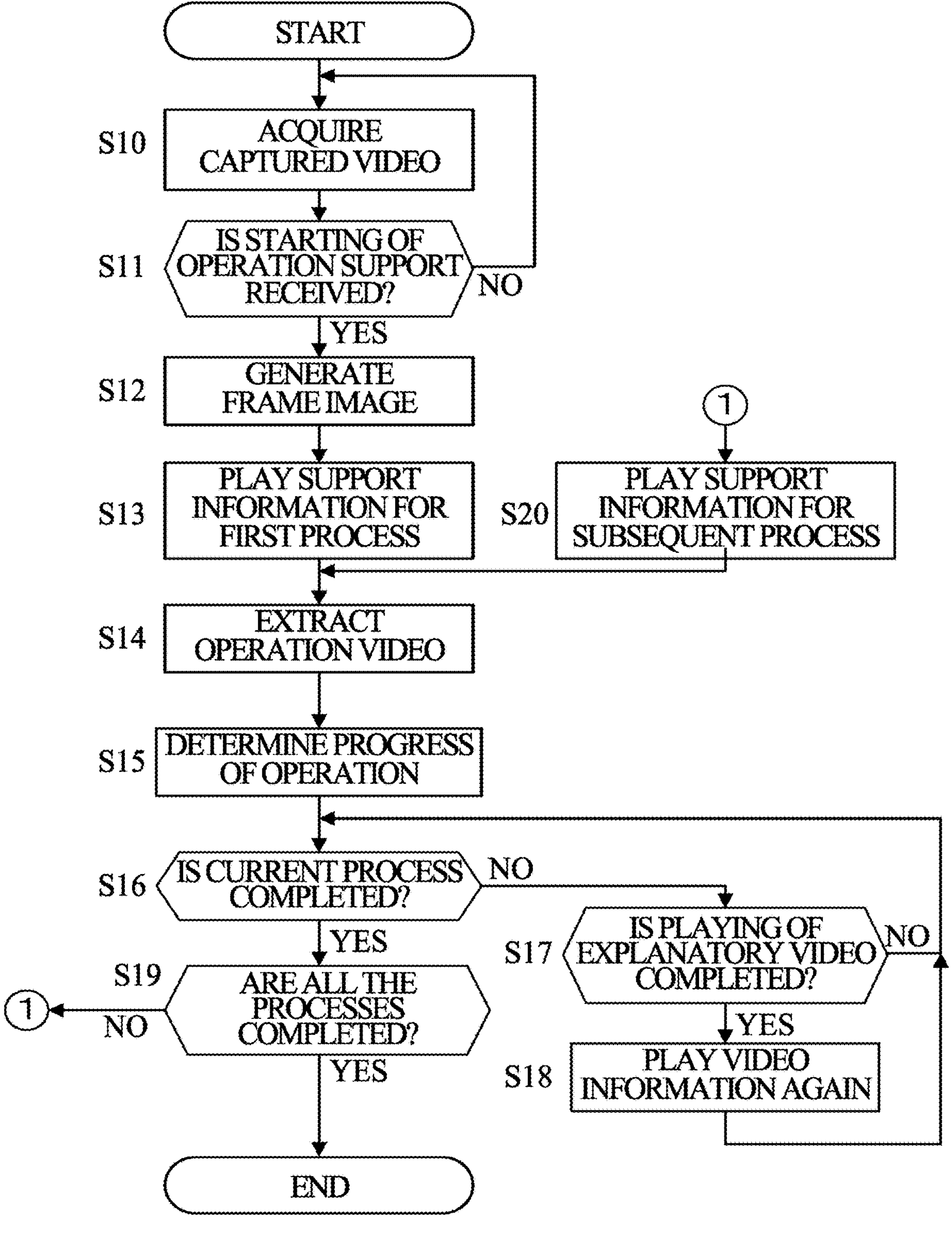
FIG. 7 is a flowchart showing an operation of a processor 11 related to operation support.

FIG. 7 is a flowchart showing an operation of the processor 11 related to operation support. At step S10, the processor 11 acquires the captured video Gx provided by the capturing device 16.

At step S11, the processor 11 determines whether the starting of operation support is received. Specifically, the processor 11 determines, based on the captured video Gx, whether a gesture of the operator corresponds to a gesture of specifying the starting of the operation support. The gesture of specifying the starting of the operation support is, for example, a gesture of holding the right hand.

The processor 11 repeats processing in step S11 and processing in step S10 until the determination at step S11 is affirmative. When the determination at step S11 is affirmative, the processor 11 advances the processing to step S12.

At step S12, the processor 11 generates the frame image Gf based on the captured video Gx. At step S13, the processor 11 plays support information for the first process. Specifically, the processor 11 reads the video information "001.wmv," the first still image information "011.jpeg," the second still image information "021.jpeg," and the text image information "031.jpeg" from the management table TBL and plays the read information. This processing causes the display 18A to display the explanatory video Gv indicated by the video information, the first still image Gs1 indicated by the first still image information, the second still image Gs2 indicated by the second still image information, the text image Gt indicated by the text image information, and the frame image Gf.

At step S14, the processor 11 extracts the operation video Gy corresponding to the work area from the captured video Gx.

At step S15, the processor 11 determines the progress of the operation based on the operation video Gy. The processor 11 acquires features F of frames of the operation video Gy individually by inputting, to the first trained model M1, still images of the frames of the operation video Gy individually. The processor 11 inputs, to the second trained model M2, features F of frames from a current frame of the operation video Gy to a frame before the current frame of the operation video Gy by a predetermined number of frames. This input causes the second trained model M2 to provide the progress information P. The progress information P indicates the position of a current work in the overall operation.

At step S16, the processor 11 determines, based on the progress information P, whether the current process is completed. When the determination at step S16 is negative, the processor 11 advances the processing to step S17.

At step S17, the processor 11 determines whether playing of the explanatory video Gv is completed. When the determination at step S17 is negative, the processor 11 returns the processing to step S16. On the other hand, when the determination at step S17 is affirmative, the processor 11 advances the processing to step S18.

At step S18, the processor 11 plays the video information, of which playing has been completed, again. When the processing at step S18 is completed, the processor 11 returns the processing to step S16. By processing from step S16 to step S18, the explanatory video Gv corresponding to the current process is repeatedly played until the current process is completed.

When the determination at step S16 is affirmative, the processor 11 advances the processing to step S19. At step S19, the processor 11 determines, based on the progress information P, whether all the processes are completed.

When the determination at step S19 is negative, the processor 11 advances the processing to step S20. At step S20, the processor 11 plays support information for a subsequent process. Specifically, the processor 11 determines a process ID corresponding to the subsequent process. The processor 11 reads the support information corresponding to the determined process ID from the management table TBL. For example, when the subsequent process is the third process, the processor 11 reads video information "003.wmv," first still image information "031.jpeg," second still image information "032.jpeg," and text image information "033.jpeg" from the management table TBL, and plays the read information. The processing in step S20 causes the operator to be provided with support information for the subsequent process. When the processing in step S20 is completed, the processor 11 advances the processing to step S14.

When the determination at step 19 is affirmative, the processor 11 terminates the processing related to the operation support.

In the above-described processing, at step S12, the processor 11 functions as the frame image generator 115. At step S14, the processor 11 functions as the extractor 111. At step S15, the processor 11 functions as the progress information generator 112, the first acquirer 112A, and the second acquirer 112B. At step S16, the processor 11 functions as the determiner 113. At step S13, at step S17, at step S18, and at step S20, the processor 11 functions as the player 114. At step S13, at step S18, and at step S20, the processor 11 functions as the output controller 116.

1.3: Effect of Embodiment

According to the above explanation, the pair of XR glasses 1 can be worn on the head of the operator performing the operation including the plurality of processes in the work area. The pair of XR glasses 1 includes the extractor 111 configured to extract the operation video Gy corresponding to the work area from the captured video Gx provided by the capturing device 16 capturing the outside world in a state in which the operator performs the operation, the progress information generator 112 configured to generate, based on the operation video Gy, the progress information P indicative of progress of the operation, the determiner 113 configured to determine, based on the progress information P, the process to be supported from among the plurality of processes, the player 114 configured to repeatedly play a piece of support information corresponding to the process determined by the determiner 113 among the plurality of pieces of support information in one-to-one correspondence with the plurality of processes until the determined process is completed, the output controller 116 configured to, in response to video information indicative of a video being included in the piece of support information played by the player 114, cause the display 18A to display the explanatory video Gv indicated by the video information, the display 18A causing the operator to visually recognize a mixed reality space.

Since the pair of XR glasses 1 includes the above-described configuration, in an operation constituted of a series of multiple processes, it is possible to provide an operator with the flow of work from a previous procedure to a future procedure in a current process. The pair of XR glasses 1 can provide the operator with the support information corresponding to the current process by executing internal processing without transmitting the captured video Gv to an external device. Thus, compared to a configuration in which the captured image Gv is transmitted to an external device, the pair of XR glasses 1 can improve security.

When the progress of the operation indicated by the progress information P is completion of the current process, the determiner 113 may preferably determine to support the subsequent process. When the determiner 113 executes such a determination, the player 114 can switch support information to be played from the support information corresponding to the current process to the support information corresponding to the subsequent process. Thus, when a certain process is completed, the operator need not interrupt the operation so as to perform instructions to play the support information corresponding to the subsequent process; as a result, efficiency of operation is improved according to the pair of XR glasses 1.

The pair of XR glasses 1 further includes the frame image generator 115 configured to generate the frame image Gf representing the outer edge of the work area based on the captured video Gx, and the output controller 116 is configured to cause the display 18A to display the frame image Gf. Since the pair of XR glasses 1 causes the operator to visually recognize the frame image Gf, the operator can recognize the work area. Since this recognition prompts the operator to perform the operation within the work area, the pair of XR glasses 1 can accurately determine the progress of the operation compared to a configuration in which the frame image Gf is not displayed.

The output controller 116 is configured to, when the video information is included in the piece of support information played by the player 114, cause the display 18A to display the explanatory video Gv so as not to overlap the work area. Since the explanatory video Gv is displayed at such a location, it is possible to improve visibility of the work area for the operator compared to a configuration in which the explanatory video Gv is displayed to be superimposed on the work area.

The storage device 12 stores the first trained model M1, which is trained to learn a relationship between an image of a frame and a feature, and the second trained model M2, which is trained to learn a relationship between features F of frames from a current frame to a frame before the current frame by a predetermined number of frames and state information indicative of progress of the operation. The progress information generator 112 includes the first acquirer 112A configured to acquire features F of frames of the operation video Gy individually by inputting, to the first trained model M1, still images of the frames of the operation video Gy individually, and the second acquirer 112B configured to acquire the progress information P provided by the second trained model M2 by inputting, to the second trained model M2, features F of frames from a current frame of the operation video Gy to a frame before the current frame of the operation video Gy by the predetermined number of frames.

Since the second acquirer 112B acquires the progress information P using the feature F, which are acquired by the first acquirer 112A, of each of the frames from the current frame to the frame before the current frame by the predetermined number of frames, it is not necessary to calculate the features F of the previous frames using the first trained model M1 again. As a result, it is possible to reduce processing time required by the progress information generator 112.

The first duration Td1 from the first point in time, at which a still image is input to the first trained model M1, until the second point in time, at which the feature F is provided by the first trained model M1, is less than or equal to the frame duration Tf from the third point in time, at which a frame starts, until the fourth point in time, at which the frame terminates, and the second duration Td2 from the fifth point in time, at which the features F of the frames from the current frame of the operation video to the frame before the current frame of the operation video by the predetermined number of frames are input to the second trained model M2, until the sixth point in time, at which the progress information P is provided by the second trained model M2, is less than or equal to the frame duration Tf. By setting those time relationships, a delay time from a point in time, at which a still image of a frame of the operation video Gy is obtained, until a point in time, at which the progress information P corresponding to the frame is generated, is less than or equal to twice the frame duration Tf.

3: Modifications

This disclosure is not limited to the embodiment described above. Specific modifications will be explained below. Two or more modifications freely selected from the following modifications may be combined.

3.1: First Modification

In the pair of XR glasses 1 according to this embodiment, the frame image generator 115 generates the frame image Gf by executing the image processing to recognize the specific color on the captured video Gx. However, this disclosure is not limited to a point of generating the frame image Gf by executing the image processing.

Figure 8:
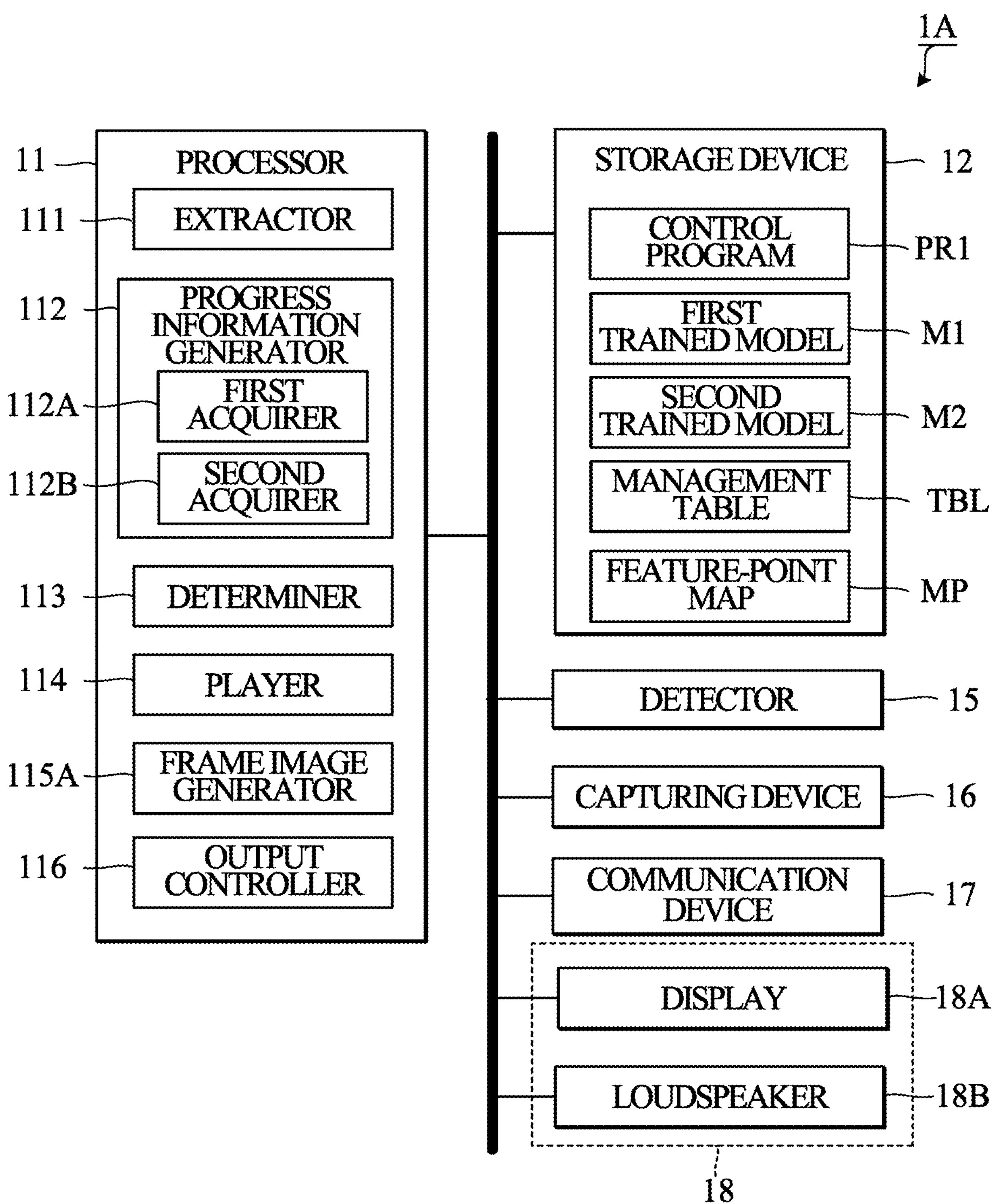
FIG. 8 is a block diagram showing an example of a configuration of a pair of XR glasses 1.

FIG. 8 is a block diagram showing an example of a configuration of a pair of XR glasses 1A according to a First Modification. The pair of XR glasses 1A has a configuration that is substantially the same as that of the pair of XR glasses 1 according to the embodiment shown in FIG. 2, except that the storage device 12 stores a feature-point map MP and a frame image generator 115A is provided in place of the frame image generator 115.

The feature-point map MP is data indicative of a plurality of feature points in a three-dimensional coordinate system. The feature-point map MP is generated, for example, by extracting the plurality of feature points from an image obtained by a stereo camera capturing a vicinity of an area in which the workbench 200 is disposed.

The frame image generator 115A executes the following processing. In first processing, a feature-point image Gz is generated by executing extraction processing to extract feature points on the captured video Gx. In second processing, a location of the pair of XR glasses 1A and an orientation of the pair of XR glasses 1A are determined by comparing the feature-point image Gz with the plurality of feature points stored in the feature-point map MP.

The frame image generator 115A determines a location of the work area in the real space based on an initial image Gr provided by the capturing device 16 in a state in which the pair of XR glasses 1A is disposed on the work area. The location of the work area is determined by executing the first processing and the second processing on the initial image Gr. For example, the operator places the pair of XR glasses 1A in the center of the work area before the operation support is provided. In this state, the operator may use a captured video Gx, which is provided by the capturing device 16 in response to the pair of XR glasses 1A being turned on, as the initial image Gr.

The frame image generator 115A generates the frame image Gf based on the captured video Gx and the location of the work area. In this case, the frame image generator 115A calculates the location and orientation of the pair of XR glasses 1A in real time by executing the first processing and the second processing on the captured video Gx. The frame image generator 115A generates the frame image Gf based on the calculated location and orientation of the pair of XR glasses 1A and on the location of the work area.

In other words, the frame image generator 115A determines the location of the work area in the real space based on the initial image Gr provided by the capturing device 16 in a state in which the pair of XR glasses 1A is disposed on the work area and generates the frame image Gf based on the determined location of the work area and on the captured video Gx.

When the frame image Gf is generated by executing the image processing to recognize the specific color on the captured video Gx, the color of the work area needs to be the specific color. In contrast, the frame image generator 115A has no restriction on the color of the work area; thus, it is possible to cause the display 18A to display the frame image Gf in various working environments.

3.1: Second Modification

In the above-described embodiment and the first modification, the support information is limited to the information related to an image. However, this disclosure is not limited to the embodiment, and the support information may include audio information indicative of sounds. When the support information includes the audio information, the player 114 repeatedly plays audio information corresponding to the process determined by the determiner 113 until the determined process is completed. When the support information played by the player 114 includes the audio information indicative of the sounds, the output controller 116 causes the loudspeaker 18B to output the sounds indicated by the audio information. The contents of the audio information may be sounds for explaining procedures of work in a corresponding process. The support information includes at least one of the video information and the audio information. The at least one of the video information and the audio information means, for example, "the video information," "the audio information," or "the video information and the audio information."

3.3: Third Modification

In the above-described embodiment, the first modification, and the second modification, the operation example model is explained as an example of the contents of the explanatory video Gv indicated by the video information. However, this disclosure is not limited thereto. The contents of the explanatory video Gv may be contents representing at least one of a document including a plurality of pages for one process among the plurality of processes and an operation example model for work for the one process. The contents representing the at least one of the document including the plurality of pages and the operation example model for the work for the one process mean, for example, "the contents representing the document including the plurality of pages," "the contents representing the operation example model for the work for the one process," or "the contents representing the document including the plurality of pages and of the operation example model for the work for the one process." When the contents of the explanatory video Gv indicates the document including the plurality of pages, the explanatory video Gv is constituted of a plurality of still images that are in one-to-one correspondence with the plurality of pages.

When the contents of the explanatory video Gv indicates the document including the plurality of pages, the player 114 repeatedly plays imagery representing the plurality of pages that are each turned in order until the process determined by the determiner 113 is completed.

According to the third modification, when the contents of the explanatory video Gv indicates the document including the plurality of pages, the operator can confirm the contents of the operation through texts, drawings, and tables included in the document.

3.4: Fourth Modification

In the above-described embodiment, the first modification, the second modification, and the third modification, the operation supporting apparatus causes the operator to visually recognize the mixed reality space, for example. However, this disclosure is not limited thereto. The pair of XR glasses 1 or 1A may cause the operator to visually recognize an augmented reality space.

In the above-described embodiment, the first modification, the second modification, and the third modification, an example of the operation supporting apparatus is the pair of XR glasses 1 or 1A. However, this disclosure is not limited thereto. The operation supporting apparatus may include not only the pair of XR glasses 1 or 1A, but also a terminal device connected to the pair of XR glasses 1 or 1A. When the operation supporting apparatus includes the terminal device, the terminal device may implement one, some, or all of the extractor 111, the progress information generator 112, the determiner 113, the player 114, and the frame image generator 115 or 115A.

4: Other Matters (1) In the foregoing embodiment and the modifications, the storage device 12 may include a ROM, a RAM, etc. The storage device 12 include flexible disks, magneto-optical disks (e.g., compact disks, digital multi-purpose disks, Blu-ray (registered trademark) discs, smart-cards, flash memory devices (e.g., cards, sticks, key drives), Compact Disc-ROMs (CD-ROMs), registers, removable discs, hard disks, floppy (registered trademark) disks, magnetic strips, databases, servers, or other suitable storage mediums. The program may be transmitted by a network via telecommunication lines. Alternatively, the program may be transmitted by a communication network NET via telecommunication lines.

(2) In the foregoing embodiment and the modifications, information, signals, etc., may be presented by use of various techniques. For example, data, instructions, commands, information, signals, bits, symbols, chips, etc., may be presented by freely selected combination of voltages, currents, electromagnetic waves, magnetic fields or magnetic particles, light fields or photons.

(3) In the foregoing embodiment and the modifications, the input and output of information, or the input or the output of information, etc., may be stored in a specific location (e.g., memory) or may be managed by use of a management table. The information, etc., that is, the input and output, or the input or the output, may be overwritten, updated, or appended. The information, etc., that is output may be deleted. The information, etc., that is input may be transmitted to other devices.

(4) In the foregoing embodiment and the modifications, determination may be made based on values that can be represented by one bit (0 or 1), may be made based on Boolean values (true or false), or may be made based on comparing numerical values (for example, comparison with a predetermined value).

(5) The order of processes, sequences, flowcharts, etc., that have been used to describe the foregoing embodiment and the modifications may be changed as long as they do not conflict. For example, although a variety of methods has been illustrated in this disclosure with a variety of elements of steps in exemplary orders, the specific orders presented herein are by no means limiting.

(6) Each function shown in FIG. 1 to FIG. 8 is implemented by any combination of hardware and software. The method for realizing each functional block is not limited thereto. That is, each functional block may be implemented by one device that is physically or logically aggregated. Alternatively, each functional block may be realized by directly or indirectly connecting two or more physically and logically separate, or physically or logically separate, devices (by using cables and radio, or cables, or radio, for example), and using these devices. The functional block may be realized by combining the software with one device described above or with two or more of these devices.

(7) The programs shown in the foregoing embodiment and the modifications should be widely interpreted as an instruction, an instruction set, a code, a code segment, a program code, a subprogram, a software module, an application, a software application, a software package, a routine, a subroutine, an object, an executable file, an execution thread, a procedure, a function, or the like, regardless of whether it is called software, firmware, middleware, microcode, hardware description language, or other names.

Software, instructions, etc., may be transmitted and received via communication media. For example, when software is transmitted by a website, a server, or other remote sources, by using wired technologies such as coaxial cables, optical fiber cables, twisted-pair cables, and digital subscriber lines (DSL), and wireless technologies such as infrared radiation and radio and microwaves by using wired technologies, or by wireless technologies, these wired technologies and wireless technologies, wired technologies, or wireless technologies, are also included in the definition of communication media.

(8) The information and parameters described in this disclosure may be represented by absolute values, may be represented by relative values with respect to predetermined values, or may be represented by using other pieces of applicable information.

(9) In the foregoing embodiment and the modifications, the terms "connected" and "coupled", or any modification of these terms, may mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be replaced with "access." As used in this specification, two elements may be considered "connected" or "coupled" to each other by using one or more electrical wires, cables, and printed electrical connections, or by using one or more electrical wires, cables, or printed electrical connections. In addition, two elements may be considered "connected" or "coupled" to each other by using electromagnetic energy, etc., which is a non-limiting and non-inclusive example, having wavelengths in radio frequency regions, microwave regions, and optical (both visible and invisible) regions.

(10) In the foregoing embodiment and the modifications, the phrase "based on" as used in this specification does not mean "based only on", unless specified otherwise. In other words, the phrase "based on" means both "based only on" and "based at least on."

(11) The term "determining" as used in this specification may encompass a wide variety of actions. For example, the term "determining" may be used when practically "determining" that some act of calculating, computing, processing, deriving, investigating, looking up (for example, looking up a table, a database, or some other data structure), ascertaining, etc., has taken place. Furthermore, "determining" may be used when practically "determining" that some act of receiving (for example, receiving information), transmitting (for example, transmitting information), inputting, outputting, accessing (for example, accessing data in a memory) etc., has taken place. Furthermore, "determining" may be used when practically "determining" that some act of resolving, selecting, choosing, establishing, comparing, etc., has taken place. That is, "determining" may be used when practically determining to take some action. The term "determining" may be replaced with "assuming", "expecting", "considering", etc.

(12) As long as terms such as "include", "including" and modifications thereof are used in the foregoing embodiment and the modifications, these terms are intended to be inclusive, in a manner similar to the way the term "comprising" is used. In addition, the term "or" used in the specification or in claims is not intended to be the exclusive OR.

(13) In the present disclosure, for example, when articles such as "a", "an", and "the" in English are added in translation, these articles include plurals unless otherwise clearly indicated by the context.

(14) In this disclosure, the phrase "A and B are different" may mean "A and B are different from each other." Alternatively, the phrase "A and B are different from C" may mean that "each of A and B is different from C". Terms such as "separated" and "combined" may be interpreted in the same way as "different."

(15) The embodiment and the modifications illustrated in this specification may be used individually or in combination, which may be altered depending on the mode of implementation. A predetermined piece of information (for example, a report to the effect that something is "X") does not necessarily have to be indicated explicitly, and it may be indicated in an implicit way (for example, by not reporting this predetermined piece of information, by reporting another piece of information, etc.).

Although this disclosure is described in detail, it is obvious to those skilled in the art that the present invention is not limited to the embodiment described in the specification. This disclosure can be implemented with a variety of changes and in a variety of modifications, without departing from the spirit and scope of the present invention as defined in the recitations of the claims. Consequently, the description in this specification is provided only for the purpose of explaining examples and should by no means be construed to limit the present invention in any way.

DESCRIPTION OF REFERENCE SIGNS

1, 1A . . . pair of XR glasses, 11 . . . processor, 12 . . . storage device, 16 . . . capturing device, 18A . . . display,

18B . . . loudspeaker, 111 . . . extractor, 112 . . . progress information generator, 112A . . . first acquirer, 112B . . . second acquirer, 113 . . . determiner, 114 . . . player, 115,115A . . . frame image generator, 116 . . . output controller, Gx . . . captured image, Gy . . . operation image, M1 . . . first trained model, M2 . . . second trained model.

The invention claimed is:

1. An operation supporting apparatus wearable on a head of an operator performing an operation including a plurality of processes in a work area, the operation supporting apparatus comprising:

an extractor configured to extract an operation video corresponding to the work area from a captured video provided by a capturing device capturing an outside world in a state in which the operator performs the operation;

a progress information generator configured to generate, based on the operation video, progress information indicative of progress of the operation;

a determiner configured to determine, based on the progress information, a process to be supported from among the plurality of processes;

a player configured to repeatedly play a piece of support information corresponding to the process determined by the determiner among a plurality of pieces of support information that are in one-to-one correspondence with the plurality of processes until the determined process is completed; and an output controller configured to:

in response to video information indicative of a video being included in the piece of support information played by the player, cause a display to display an explanatory video indicated by the video information, the display causing the operator to visually recognize a mixed reality space, and in response to audio information indicative of sounds being included in the piece of support information played by the player, cause a loudspeaker to output the sounds indicated by the audio information.

2. The operation supporting apparatus according to claim 1, wherein the determiner is configured to determine, when the progress of the operation indicated by the progress information is completion of a current process, to support a subsequent process.

3. The operation supporting apparatus according to claim 1, further comprising a frame image generator configured to generate a frame image representing an outer edge of the work area based on the captured video, and wherein the output controller is configured to cause the display to display the frame image.

4. The operation supporting apparatus according to claim 3, wherein the output controller is configured to, when the video information is included in the piece of support information played by the player, cause the display to display the explanatory video so as not to overlap the work area.

5. The operation supporting apparatus according to claim 3, wherein the frame image generator is configured to:

based on an initial image provided by the capturing device in a state in which the operation supporting apparatus is disposed in the work area, determine a location of the work area in a real space, and generate the frame image based on the determined location of the work area and on the captured video.

6. The operation supporting apparatus according to claim 1, wherein the explanatory video has contents representing at least one of:

a document including a plurality of pages for one process among the plurality of processes, or an operation example model for work for the one process.

7. The operation supporting apparatus according to claim 6, wherein the player is configured to, when the contents of the explanatory video include the document, repeatedly play imagery representing the plurality of pages that are each turned in order until the process determined by the determiner is completed.

8. The operation supporting apparatus according to claim 1, further comprising a memory storing:

a first trained model trained to learn a relationship between an image of a frame and a feature, and a second trained model trained to learn a relationship between features of frames from a current frame to a frame before the current frame by a predetermined number of frames and state information indicative of progress of the operation, and wherein the progress information generator includes:

a first acquirer configured to acquire features of frames of the operation video individually by inputting, to the first trained model, still images of the frames of the operation video individually, and a second acquirer configured to acquire the progress information provided by the second trained model by inputting, to the second trained model, features of frames from a current frame of the operation video to a frame before the current frame of the operation video by the predetermined number of frames.

9. The operation supporting apparatus according to claim 8, wherein a first duration from a first point in time at which a still image is input to the first trained model until a second point in time at which the feature is provided by the first trained model is less than or equal to a frame duration from a third point in time at which a frame starts until a fourth point in time at which the frame terminates, and wherein a second duration from a fifth point in time at which the features of the frames from the current frame of the operation video to the frame before the current frame of the operation video by the predetermined number of frames are input to the second trained model until a sixth point in time at which the progress information is provided by the second trained model is less than or equal to the frame duration.

* * * * *